Feb. 14, 1928.

I. H. ATHEY 1,659,073

VEHICLE

Filed July 31, 1922

Inventor
Isaac H. Athey
Williams Bradbury
McCaleb & Pierce Attys

Patented Feb. 14, 1928.

1,659,073

UNITED STATES PATENT OFFICE.

ISAAC H. ATHEY, OF CHICAGO, ILLINOIS, ASSIGNOR, BY MESNE ASSIGNMENTS, TO ATHEY TRUSS WHEEL CO., OF CHICAGO, ILLINOIS, A CORPORATION OF ILLINOIS.

VEHICLE.

Application filed July 31, 1922. Serial No. 578,634.

My invention relates to improvements in vehicles, and is particularly concerned with improvements in that type of vehicle comprising a pair of rear load supporting wheels upon which is mounted the load supporting frame, and a pair of front wheels, the principal purpose of which is to balance the load supporting frame upon the rear wheels and to guide the vehicle.

In vehicles of this type, provision has heretofore been made for permitting a certain limited movement of the axle supported by the front wheels relatively to the load supporting frame, but the constructions have been such that considerable difficulty has been experienced by its breakage if for any reason the front end of the load supporting frame should tilt upwardly sufficiently to place the weight of the front wheels and connected mechanism upon the connection between these wheels and the load supporting frame.

One of the objects of my present invention is to provide a vehicle of the character described, in which the means for connecting the front axle with the load supporting frame is so constructed as to permit the front axle to move or tilt in substantially any direction relatively to the load supporting frame, without placing undue twisting stresses upon the means connecting the front axle and the load supporting frame.

Another object of my invention is to provide means of the character described which is simple in construction and economical to manufacture.

Other objects of my invention will appear as this description progresses, reference being had to the accompanying drawings, in which Figure 1 is a plan view of a vehicle embodying my invention;

Figure 1:
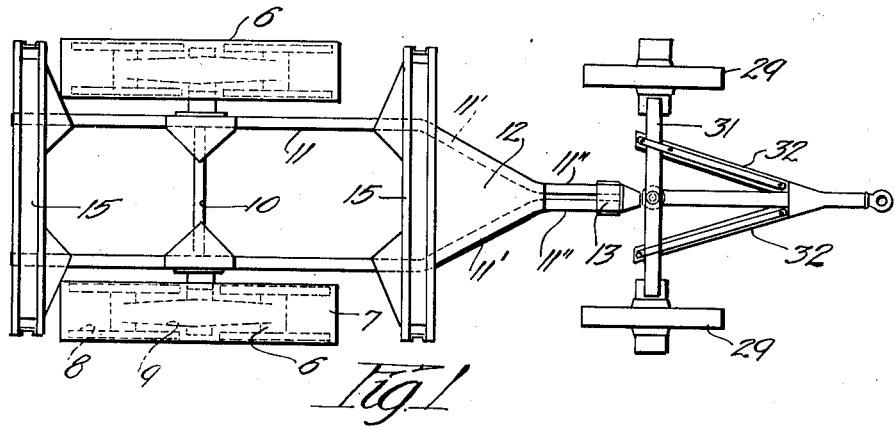
Figure 2:
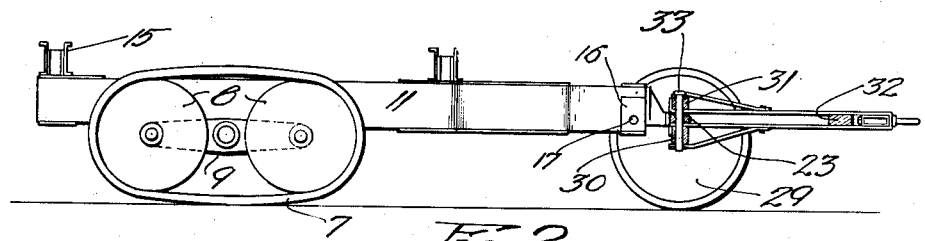
Figure 2 is a side elevation thereof, partly in section.

In the embodiment of my invention illustrated in the drawings hereof, I have shown two rear load supporting wheels 6, each of which is illustrated as comprising a flexible, movable track 7, and a pair of load supporting wheels 8 rolling upon said track in spaced relation and rotatably mounted upon the opposite ends of the beam 9. The beams 9 are rotatably mounted upon the outer ends of the rear axle 10, which supports the load supporting frame comprising the two side members 11, each of which is formed from a channel shaped member, the upper and lower flanges of which are turned inwardly. The forward ends of these side members converge as shown at 11' and end in parallel extensions 11''. The converging portions of the side members are secured together by means of a gusset plate 12, and plates 13 and 14 riveted to the flanges of the extensions 11, may also be used for securing these members together. Bunks 15 extending transversely of the side members and secured thereto in a suitable manner may be used for supporting the load. The particular vehicle disclosed in the drawings is designed to be used for hauling logs, but my invention is not, of course, limited to a vehicle to be used for this particular purpose. Side plates 16, riveted to the webs of the channels forming the side members 11, reinforce these members at a point adjacent the front end of the extensions 11''.

Figure 3:
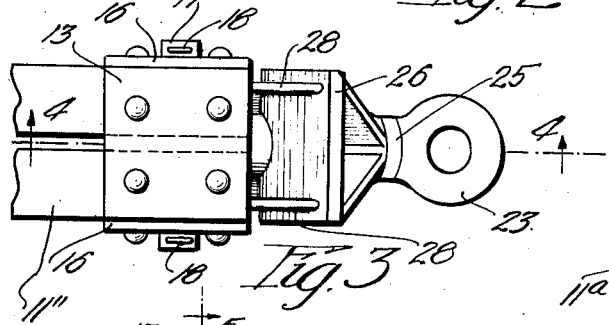
Figure 3 is a plan view of the means for connecting the front axle to the load supporting frame shown upon an enlarged scale.
Figure 4:
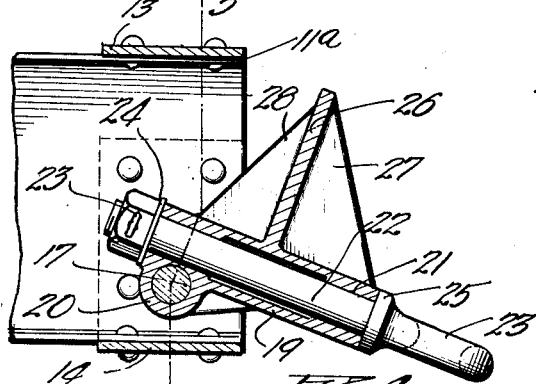
Figure 4 is a longitudinal section taken on line 4—4 of Figure 3.
Figure 5:
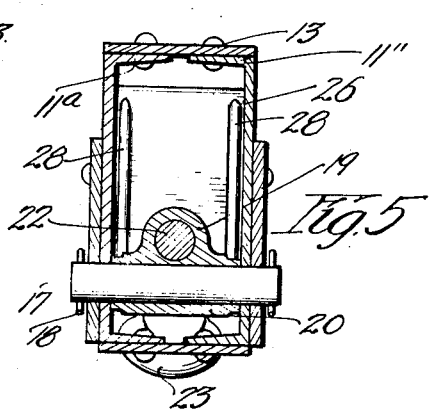
Figure 5 is a transverse section taken on line 5—5 of Figure 4.

Aligned, transversely extending openings formed in the webs of the channel members, and the reinforcing plates 16 provide spaced bearings for the transversely extending pintle or pivot pin 17, which is prevented from displacement by means of cotter pins 18 extending through the opposite ends thereof, as shown in Figure 3. A connecting block 19 is provided with a transverse bore 20 for receiving the pintle 17, thus providing a hinged connection between the block and the front end of the load supporting frame. The block 19 is also provided with the longitudinally extending bore 21 for receiving the swivel bolt 22 which is retained in place by the nut 23 and washer 24 at one end, and the shoulder 25 at its front end. The front end of the swivel bolt 22 terminates in a ring or eye 23. The block 19 has extending upwardly therefrom an arm 26, the upper end of which is adapted to engage with the upper flanges 11ª of the side members 11 to limit the movement of the block 19 in an upward direction about the pintle 17. The arm 26 is reinforced by the frontwardly and rearwardly extending gussets 27 and 28 respectively, which are formed integral with the arm 26 and the block 19.

The front or guiding wheels 29 are mounted upon the axle 30 from which the sand board 31 is spaced by the tongue braces 32. The eye or ring 23 extends between the axle 30 and the sand board 31 and is pivotally secured thereto by means of the king pin 33.

Pintle 17, block 19 and bolt 22 thus form a coupling between the load supporting and guiding wheels. This coupling readily permits a relative vertical movement between the wheels about a transverse axis, i. e., axis of pintle 17, and also a relative oscillation therebetween about a longitudinal axis, i. e., the axis of bolt 22.

From the foregoing description it will be apparent that under usual operating conditions the arm 26 of the block 19 will be in contact with the front ends of the side members 11', thus limiting the downward movement of the front end of the load supporting frame, and that the front wheels are free to oscillate in a vertical plane to accommodate themselves to any irregularities of the ground and also free to move about a vertical axis, that is, about the king pin for the purpose of steering the vehicle.

Furthermore, if for any reason the front end of the load supporting frame should tilt upwardly the block 19 will merely move about the horizontal axis 17 without placing any undue strain upon the connection between the front wheels and the frame. In addition, if the load supporting frame should tip so far as to lift the front wheels entirely off the ground, under which condition they will tend to tip to one side or the other, they may do so freely without subjecting the connections between them and the frame to twisting stresses tending to disrupt this connection.

While I have described the details of the preferred embodiment of my invention, it is to be clearly understood that my invention is not limited to these details of construction, but is capable of other adaptations and modifications within the scope of the appended claims.

Having thus described my invention, what I claim is:

1. A vehicle comprising a pair of rear load supporting wheels, an axle for said wheels, a load supporting frame carried by said axle comprising a pair of spaced parallel side members, the front ends of which converge and end in parallel extensions, means for securing said extensions together, a pintle transversely mounted in the ends of said extensions near the lower sides thereof, a block hinged on said pintle and having a bore extending therethrough from front to rear, an arm extending upwardly from said block for engaging the ends of said side members, and limiting the motion of said block, a swivel bolt journaled in said bore, the front end of said bolt terminating in an eye, a pair of front wheels, a front axle and sand boards supported by said front wheels in spaced relation for receiving said eye therebetween, and a king pin passing through said axle and sand board and said eye.

2. A vehicle comprising a pair of rear load supporting wheels, a rear axle supported by said rear wheels, a load supporting frame carried by said axle, a transversely extending pintle carried by the front end of said frame, a block hinged on said pintle and having a bore longitudinally extending therein, coacting means on said block and frame for limiting the upward swing of said block, a swivel bolt journaled in said bore, the front end of said bolt terminating in an eye, a pair of front wheels, a front axle supported thereby, and a king pin for pivotally connecting said front axle with said eye.

3. A vehicle having front and rear wheels, a frame extending between the wheels, and a coupling for attaching the frame to one of the wheels and comprising a connecting block which is hinged to the frame to permit relative movement therebetween about a transverse axis and which is provided with a bolt which permits relative movement about a longitudinal axis, and a stop for limiting the upward movement of the block about the transverse axis.

4. A vehicle comprising a load supporting frame, a pair of rear load supporting wheels therefor, the front ends of said frame terminating in a tubular extension, a block partially received within said tubular extension and transversely mounted for pivotal movement within said tubular extension whereby the block may move in a vertical path, a stop member carried by the block to limit the upward movement of the block and serving as a closure for the end of the tubular extension when in engagement therewith, said block having a bore extending longitudinally therethrough transverse to the pivotal mounting of the block, and a swivel bolt journaled in said bore, the front end of said bolt terminating in an eye for connection with the front wheel assembly of a vehicle.

In witness whereof, I hereunto subscribe my name this 20 day of July, 1922.

ISAAC H. ATHEY.

CERTIFICATE OF CORRECTION.

Patent No. 1,659,073.                                       Granted February 14, 1928, to

ISAAC H. ATHEY.

It is hereby certified that error appears in the printed specification of the above numbered patent requiring correction as follows: Page 2, line 84, claim 2, strike out the word "bore" and insert the same to follow after the word expending in the same line; and that the said Letters Patent should be read with this correction therein that the same may conform to the record of the case in the Patent Office.

Signed and sealed this 3rd day of April, A. D. 1928.

M. J. Moore,

Seal.                                                       Acting Commissioner of Patents.